United States Patent [19]
Bastiaansen et al.

[11] Patent Number: 5,205,974
[45] Date of Patent: Apr. 27, 1993

[54] PROCESS FOR THE PREPARATION OF CONTINUOUS OBJECTS OF PLASTICS

[75] Inventors: Cornelis W. M. Bastiaansen, Geleen; Henricus E. H. Meijer, Born, both of Netherlands; Zaheer Bashir, Coventry, Great Britain

[73] Assignee: Stamicarbon B.V., Geleen, Netherlands

[21] Appl. No.: 794,973

[22] Filed: Nov. 20, 1991

Related U.S. Application Data

[62] Division of Ser. No. 360,838, Jun. 2, 1989, Pat. No. 5,080,849.

[30] Foreign Application Priority Data

Jun. 3, 1988 [NL] Netherlands .................. 8801426

[51] Int. Cl.⁵ .................. D01D 5/12; D01F 6/04
[52] U.S. Cl. .................. 264/210.1; 264/210.8; 264/211.12; 264/288.4; 264/290.5
[58] Field of Search ............. 264/210.1, 210.8, 211.12, 264/288.4, 288.8, 290.5

[56] References Cited

U.S. PATENT DOCUMENTS 4,948,545  8/1990  Bashir et al. .................. 264/210.8

FOREIGN PATENT DOCUMENTS 1513343  8/1985  European Pat. Off. .

OTHER PUBLICATIONS

Abhiraman, A. S. "Shish Kebab and High-Performance Morphologies", *Journal of Applied Polymer Science*, vol. 23, No. 8 (1979), pp. 2419–2424.

*Primary Examiner*—Leo B. Tentoni
*Attorney, Agent, or Firm*—Cushman, Darby & Cushman

[57] ABSTRACT

A process for the manufacture of filaments, tapes and films that possess a shish-kebab morphology. This is effected in that for instance UHMW PE after extrusion is stretched at a temperature between the melting temperature (Tm) and a critical temperature (Tc) and subsequently cooled in stressed condition. The stretching rate is between 0.1 and 10 [sec.]$^{-1}$.

8 Claims, 1 Drawing Sheet

PROCESS FOR THE PREPARATION OF CONTINUOUS OBJECTS OF PLASTICS

This is a division of application Ser. No. 07/360,838, filed Jun. 2, 1989, which is now U.S. Pat. No. 5,080,849.

The invention relates to a process for the manufacture of continuous objects of plastic that have a shish kebab morphology.

BACKGROUND OF THE INVENTION

1. Field of the Invention

Continuous objects of plastic, such as filaments with a shish kebab morphology, are known from EP-A-151343.

2. Description of the Related Art

This morphology in the object is obtained by extrusion of a polyolefin with a weight average molecular weight ($M_w$) of $3 \times 10^5 - 10^6$ g/mol, applying in the die channel a temperature which is a few degrees Celsius higher than the temperature at which the polyolefin melt solidifies spontaneously.

Drawbacks of the known process are that it is extremely difficult to maintain the temperature in the die channel within the required limits and that the rate of production with which continuous objects can be manufactured in practice is rather low. Also, the process is less suitable for the manufacture of films.

SUMMARY OF THE INVENTION

The object of the invention is to provide a process for the manufacture of continuous objects that does not show the said drawbacks and which moreover is suitable for the manufacture of tapes and films. This is achieved in that a plastic, with a relatively high weight average molecular weight ($M_w$) for that particular type of plastic, is converted in the melt to a continuous article, in that this article is stretched at a temperature lying between the melting temperature of the non-orientated plastic ($T_m$) and a certain higher temperature (Tc), in that the rate of stretching lies between, on the one hand, a lower rate (Ve), but which is higher than the rate of relaxation of the chain molecules under the prevailing conditions, and on the other a higher rate, but which is not so high that the melt begins to show elastic behaviour under the prevailing conditions, and in that the stretched article, while stressed, is rapidly cooled to a continuous object.

DESCRIPTION OF THE PREFERRED EMBODIMENTS

In EP-A-151343 it is extensively described what is meant by a shish kebab morphology and what conditions are required to obtain a high tensile strength. Further, reference can be made to the book "Developments in Oriented Polymers-1", edited by I. M. Ward, published by Elsevier Applied Science, London and New York, 1987. A shish kebab morphology is characterized by a core consisting of more or less elongated polymer molecules, termed 'shish', with overgrowths, termed 'kebabs', interspaced along the chains and consisting of plate-shaped crystals of folded molecular chains. The plate-shaped crystals, also termed 'lamellae', surround the core and are angularly disposed relative to the core. In the shaped object the cores are parallel and so close to each other that the lamellae of the one core overlap with those of the other.

The shish kebabs that can be formed from a melt of non-orientated molecular chains during the stretching process in the melt disappear if the temperature (Tc) of the melt becomes too high. This temperature has to be established for each polymer, using the melting curve of the shaped article as known from EP-A-151343. A structure examination by electron microscopy with the use of replicas is also a suitable method. The stretching temperature should not exceed the temperature Tc thus found.

The stretching rate also requires special attention. By the stretching rate is understood here the stretching ratio (lambda) divided by the number of seconds needed to achieve that stretching. By the stretching ratio, lambda, is understood here the ratio L $$\frac{L}{Lo}$$

where Lo is the initial length and L the length after stretching. During the stretching two opposed phenomena occur. On the one hand, the molecular chains are elongated under the influence of the stretching force, so that they are disposed parallel to the direction of the stretching force, on the other, this phenomenon is counter-balanced by the so-called relaxation, which tends to restore the molecular chains to the coiled, disordered condition. The relaxation also has a certain rate of progress, so that the stretching rate should be higher than the relaxation rate. The point at which these rates offset each other as it were and the corresponding stretching rate can easily be determined empirically; in the solid it is higher than in a melt and for polymers with a lower Mw it is higher than for polymers with a higher Mw.

The stretching rate must not be too high either, because otherwise the melt reacts elastically and breaks. This stretching rate can thus also be easily determined empirically.

The weight average molecular weight Mw should be chosen between appropriate limits in order to achieve higher-than-normal E moduli and tensile strengths. If the Mw is too low, no shish kebab morphology at all forms in the melt or a shish kebab morphology in which the ratio between shish and kebab is too low or in which the cores are too far apart, so that the lamellae do not overlap each other. If by contrast the Mw is too high, problems will arise during processing, for instance with an extruder. Here too the person skilled in the art will use an empiric approach.

From a technological point of view the chance that the relaxation rate and the stretching rate offset each other is greater when using polymers with broad molecular weight distributions, because such polymers have a broad relaxation spectrum. Part of the polymer will always assume the shish morphology then.

By rapid cooling the shish kebab morphology obtained in the stretched article is frozen in stressed condition and the article is formed as film or filament with a high E modulus and high tensile strength.

The invention is applicable in particular for (co)-polyolefins, by which are understood here one or more homopolymers, copolymers or melt mixtures of two or more (co)polymers.

Because of the simple molecular structure, the plastic preferably consists of a polyethylene with an Mw between 400,000 and 1,500,000 g/mol, in particular between 500,000 and 1,200,000 g/mol, more in particular between 800,000 and 1,000,000 g/mol.

The definition of polyethylene in this content includes copolymers of ethylene with at most 5 wt. % of an alkene-1 with 3 or more carbon atoms.

In the case of polyethylene with an Mw between 400,000 and 1,000,000 g/mol the stretching temperatures are preferably between 130° and 160° C., in particular between 140° and 160° C. For other polymers these limits can be different. In the case of a polyethylene with an Mw between 400,000 and 1,000,000 g/mol the stretching rates are preferably between 0.1 and 10 sec$^{-1}$, more in particular between 0.5 and 5 sec$^{-1}$.

The invention also relates to a device for the implementation of the invention, comprising an extrusion machine and a downstream stretching device consisting of at least a feed roll and a haul-off roll, with a heating oven in between. The device is characterized in that between the extrusion machine and the feed roll a cooling device is placed for cooling of the extrudate to a temperature between the extrusion temperature and the melting temperature of the plastic, in that one or more feed rolls are also heating rolls and in that means are provided for rapid cooling of the stretched object between the heating oven and the haul-off roll.

A device so designed better permits control of the temperature of the extrudate during the stretching. For by controlling the temperature in the cooling device in dependence on the extrusion temperature, the stretching process can now be carried out temperature independent of the extrusion process. The cooling device can be operated with liquid or gas.

The invention will now be elucidated with reference to a number of tests.

Tests

For the tests a number of polyethylene grades were used, stated in Table 1 with indication of their Mw, Mn (is the number average molecular weight) and the Mw/Mn ratio as well as the producer.

TABLE 1

| Polyethylene | Mw g/mol | Mn g/mol | Mw/Mn | Producer |
|---|---|---|---|---|
| Rigidex 006-60 | 130,000 | 19,200 | 5.9 | BP Chemic. Ltd. |
| Rigidex HO-2054P | 350,000 | 24,400 | 14.3 | BP Chemic. Ltd. |
| PE 'R' | 411,000 | 73,500 | 5.6 | BP Chemic. Ltd. |
| Hizex 145 | 950,000 | 121,300 | 8.9 | Mitsui |
| Hizex 240M | 1,974,000 | 226,000 | 8.74 | Mitsui Petrochemicals |

Of each of the polyethylene reactor powders a specimen with a thickness of 0.5 mm was made by compression moulding for 15 minutes at a temperature of 145° C. followed by rapid cooling in cold water. From the specimens test pieces were cut which were maximally stretched at a stretching rate of 5 sec.$^{-1}$ above the melting temperature and subsequently cooled in stressed condition.

The tensile moduli were measured in an Instron stretching device on test specimens with a length of 10 cm at a rate of 1 mm/min. The cross-section surface areas were calculated from the weight of the test specimens, on the basis of a polyethylene density of 0.97.

Table 2 shows the stretching temperature, the stretching ratio and the measured strength properties for each of the polyethylene of Table 1.

TABLE 2

| Polyethylene | Melt temp. at stretching, °C. | Stretching ratio | Axial E-modulus GPa | Axial strength GPa |
|---|---|---|---|---|
| Rigidex 006-60 | 130–131 | ×50–60 | 2 | 0.2 |
| Rigidex HO-2054P | 135 | ×20–35 | 40–60 | 0.4 |
| Rigidex HO-2054P | 140 | ×60 | 8–10 | 0.2 |
| PE 'R' | 142 | ×60–80 | 15–20 | 0.5 |
| Hizex 145 | 145 | ×60–80 | 60–80 | 0.7–1.5 |
| Hizex 240M | 158 | ×17–20 | 10–15 | 0.35 |

From Tables 1 and 2 it can be seen that below an Mw of 400,000, good mechanical properties cannot even be obtained at high stretching ratios. Above an MW of 1,000,000 not only is the processing of polyethylene difficult, but the mechanical properties obtained are surprisingly not interesting either. The tensile strength for Hizex 240M is only 0.35 GPa.

Figure 1:
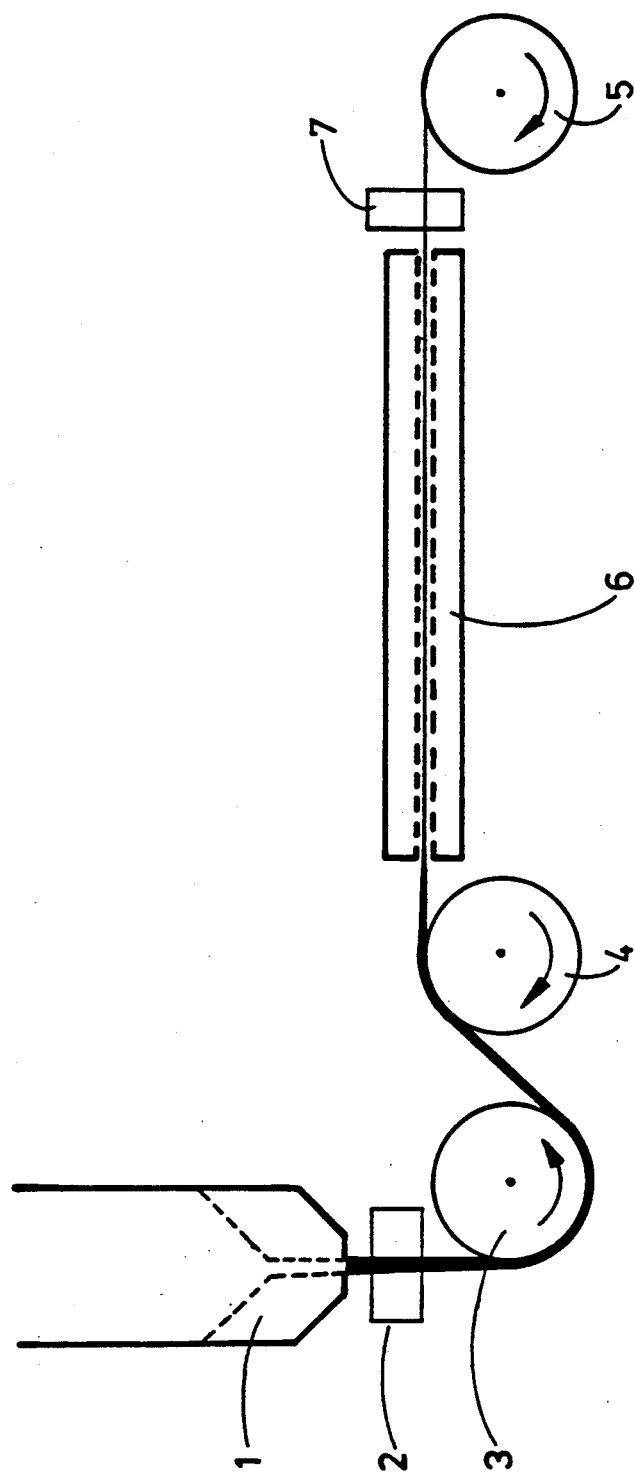
FIG. 1 is a schematic representation of a device according to the invention, with which the process according to the invention can be carried out. From the extrusion machine 1 the extrudate in the form of a filament, tape or film is supplied to the cooling device 2, in which the extrudate is cooled to below its melting point. From the cooling roll the cooled extrudate, still non-orientated, is supplied to a feed roll section, of which for instance only feed roll 4 is also a heating roll, and heated to 5° to 10° C. below the melting point of the plastic and is subsequently drawn through the oven 6 by means of the haul-off roll 5. The oven heats the extrudate to a temperature between 130° and 160° C. Because the haul-off roll 5 has a higher circumferential speed than the roll 4, stretching takes place in the oven. The rolls 3 and 4 have the same circumferential speed.

The cooling device 2 and the heated feed roll 4 allow of better temperature control in the oven of the extrudate to be stretched. Between the heating oven 6 and the haul-off roll 5, 7 is a schematic indication of means for rapid cooling in stressed condition of the stretched object.

We claim:

1. Process for the manufacture of continuous objects of plastic that possess a shish kebab morphology, wherein a non-oriented plastic with a relatively high weight average molecular weight (Mw) and containing chain molecules with a particular rate of relaxation is in a melt state and then converted to a continuous article, said article being cooled, the cooled article being heated to and stretched at a temperature lying between the melting temperature of the non-orientated plastic (Tm) and a certain higher temperature (Tc), in that the rate of stretching lies between a lower rate (Ve) which is higher than the rate of relaxation of the chain molecules and a higher rate which is not so high that the melt begins to show elastic behavior, and rapidly cooling the resulting stretched article, while stressed, to a continuous object.

2. Process according to claim 1, wherein the plastic is polyethylene with an Mw between 400,000 and 1,500,000 g/mol.

3. Process according to claim 1, wherein the plastic is polyethylene with an Mw between 500,000 and 1,200,000 g/mol.

4. Process according to claim 1, wherein the plastic is polyethylene with an Mw between 800,000 and 1,000,000 g/mol.

5. Process according to claim 1, wherein the stretching takes place at a temperature between 130° C. and 160° C.

6. Process according to claim 1, wherein the stretching rate lies between 0.4 and 10 s$^{-1}$.

7. Process according to claim 1, wherein the stretching rate lies between 0.5 and 5 s$^{-1}$.

8. Process for the manufacture of continuous objects of polyethylene that possess shish-kebab morphology wherein a polyethylene having a weight average molecular weight between 400,000 and 1,500,000 g/mol, is in the melt state and then converted to a continuous object, said object being cooled, the cooled object being heated to and stretched at a temperature between 130° C. and 160° C. at a stretching rate of 0.1–10 s$^{-1}$ to form the shish-kebab morphology.

* * * * *